UNITED STATES PATENT OFFICE.

RALPH H. McKEE, OF NEW YORK, N. Y.

PROCESS OF ALLOYING ZIRCONIUM AND IRON.

1,401,267. Specification of Letters Patent. Patented Dec. 27, 1921.

No Drawing. Application filed March 29, 1921. Serial No. 456,746.

*To all whom it may concern:*

Be it known that I, RALPH H. McKEE, a citizen of the United States, residing in the borough of Manhattan, city, county, and State of New York, have invented certain new and useful Improvements in Processes of Alloying Zirconium and Iron, of which the following is a specification.

My present invention relates to an improved process of alloying zirconium and iron applicable to the combination of zirconium with any of the commercial forms of iron or steel.

Prior processes for these purposes have involved the use of various reagents, which must either be eliminated, or else become a source of disadvantage in the finished product. The present invention rests upon my discovery that zirconium can be alloyed successfully with iron in its various commercial forms by merely adding zirconium silicate in due excess to the molten iron or steel, without the use of fluxes or other reagents. This process has the advantage of the utmost simplicity, and avoids the difficulties due to the presence of reagents remaining in the final product.

As an example of a specific formula for the manufacture of a zirconium steel having a low percentage of zirconium, I add to the molten iron or steel, at the temperature of the furnace, a sufficient quantity of zirconium silicate to supply an amount of zirconium representing about one per cent. of the weight of the resultant steel, making sure that the zirconium becomes properly diffused through the mass, by stirring or otherwise. There will thus be produced a zirconium steel containing approximately 0.3 per cent. of zirconium. By the addition of correspondingly larger proportions of zirconium silicate, steels containing considerably larger percentages of zirconium can be produced. In any case, approximately the proportion of excess of zirconium above indicated should be employed, and to get the best results it is advisable to carry out the process at a temperature in excess of that barely requisite for fusion.

As another example of a modification of my process, wherein higher percentages of zirconium are combined in the final product, I may add to one hundred parts of molten cast iron, seventy parts of zirconium silicate, which should be treated as above described. This will produce an alloy containing about twenty per cent. of zirconium. In any case, a sufficient excess of iron is used to separate the oxygen and silica from the zirconium silicate. The resulting iron oxid separates as a slag, combining in part with the silica impurity of the crude ore and in part with a portion of the zirconium oxid.

It is not essential that a perfectly pure zirconium silicate be used, as certain impurities may, in some cases, be tolerated. For instance, the native zirconium silicate known as "zircon" may be used in this connection. Zircon is available in large amounts as a quite pure sand from the beach sands of Florida and from other sources in the United States. Being thus cheaply and readily obtained it has an advantage in the commercial art over zirconium oxid (baddeleyite) which is found in commercial quantities as a zirconium ore only abroad (interior of Brazil.) Accordingly, the present process has an advantage over that employing zirconium oxid in that zirconium silicate is a more available zirconium ore. The present process using zirconium silicate has also the further advantage over the aforementioned process using zirconium oxid in that zirconium silicate has a lower fusing point than zirconium oxid and hence is easier to handle in the plant.

What I claim is:

The process of alloying zirconium with iron, which consists in mixing zirconium silicate, free from flux or other reagent, directly with the iron at a temperature above the melting point thereof and in the presence of a sufficient excess of iron to separate the silica and oxygen from the zirconium silicate.

This specification signed and witnessed this 26th day of March, 1921.

RALPH H. McKEE.

Witnesses:
GEORGE BARSKY,
ISRAEL HOFFBERG.